Patented Oct. 1, 1929

1,729,752

UNITED STATES PATENT OFFICE

GEORGE T. SOUTHGATE, OF FOREST HILLS, NEW YORK

DEODORANT COMPOSITION

No Drawing. Application filed February 23, 1926, Serial No. 90,148. Renewed April 14, 1928.

My invention relates to compositions of matter intended for deodorant uses, and particularly to compositions acting on the principle of producing non-disagreeable fermentations as preventives of the formation of malodorous or cutaneously irritating compounds. The basic constituent of my new composition is preferably baker's yeast; but any ferment may be used that is productive of the said favorable fermentation and non-productive and arrestive of foul fermentation or putrefaction.

The functional discharges of the body, such as perspiration, menstrual flow, urine, and fecal matter, damp excretions which form malodorous compounds that are often cutaneously irritating to the parts of the body with which they remain in contact. I have found that when live yeast is applied to such discharges or to parts of the body where such discharges accumulate, the fermentation set up by the yeast prevents the formation of bad odors and cutaneously irritating compounds. Apparently the explanation lies in the greater vitality of the yeast fermentation than that of putrefaction, to which it becomes the superior rival in the conversion of the waste matter from its original chemical nature. The anti-putrescent and anti-irritant effect of yeast is especially suitable for the catamenial discharge; being accomplished merely by applying a moderate quantity of the ferment to the fresh napkin. In general, it may be used on any parts of the skin or membranes, because of its harmless nature.

I have found on the other hand that the organic odor of yeast is of itself sufficiently objectionable to be a strong deterrent to its personal use, because of the mental suggestion that this scent resembles bodily odors, and because it is olfactorily fatiguing. Upon experimentation I have discovered that the odor of the yeast may be practically completely masked by suitable perfuming, and that strong, indelicate or unusual perfume need not be used therefor. As an example of such satisfactory masking I have perfumed yeast with rosewater, and have found that the small quantity thereof which suffices to convert the ordinary commercial compressed cakes into a conveniently usable soft paste submerges the yeast odor and imparts a mild, fresh and agreeable scent to the mixture. I have also employed other perfumes with good results.

For light application to the skin a suspension of yeast in perfumed liquid is convenient. The paste form has the advantage of high activity, and is readily applicable to anatomical parts or to napkins, but both liquid and paste forms must be kept chilled if not used promptly. In the powdered, sensibly dry form, yeast may be conveniently applied by sprinkling and in this state it has the convenience of requiring little care for preservation of its life. Perfume may be added to the powdered form through the vehicle of a scented powder.

Deodorant sanitary napkins of good keeping qualities may be made as aforesaid, by sprinkling with powdered yeast or by applying yeast paste on the surface or including within and suitably drying. Malt or other yeast food may be associated with the yeast in any case.

In the claims, the term yeast is to be understood as including any ferment or enzyme sufficiently active and of suitable nature to produce the stated effect.

I claim:

1. A composition for toilet use in contact with functional body discharges and effective to prevent such discharges from forming malodorous or irritating compounds, said composition comprising yeast in sensibly dry condition, and material effective to mask the natural odor of yeast.

2. A catamenial bandage comprising absorbent material and sensibly dry yeast associated therewith to prevent discharges absorbed by said material from forming malodorous and irritating substances.

3. A catamenial bandage comprising absorbent material, sensibly dry yeast associated therewith to prevent discharges absorbed by said material from forming malodorous and irritating substances, and material effective to mask the natural odor of the yeast.

In testimony whereof I affix my signature.
GEORGE T. SOUTHGATE.